March 9, 1943.  R. L. GEER  2,313,637
HARDWARE FOR CONCRETE FORMS
Filed July 13, 1940  2 Sheets-Sheet 2
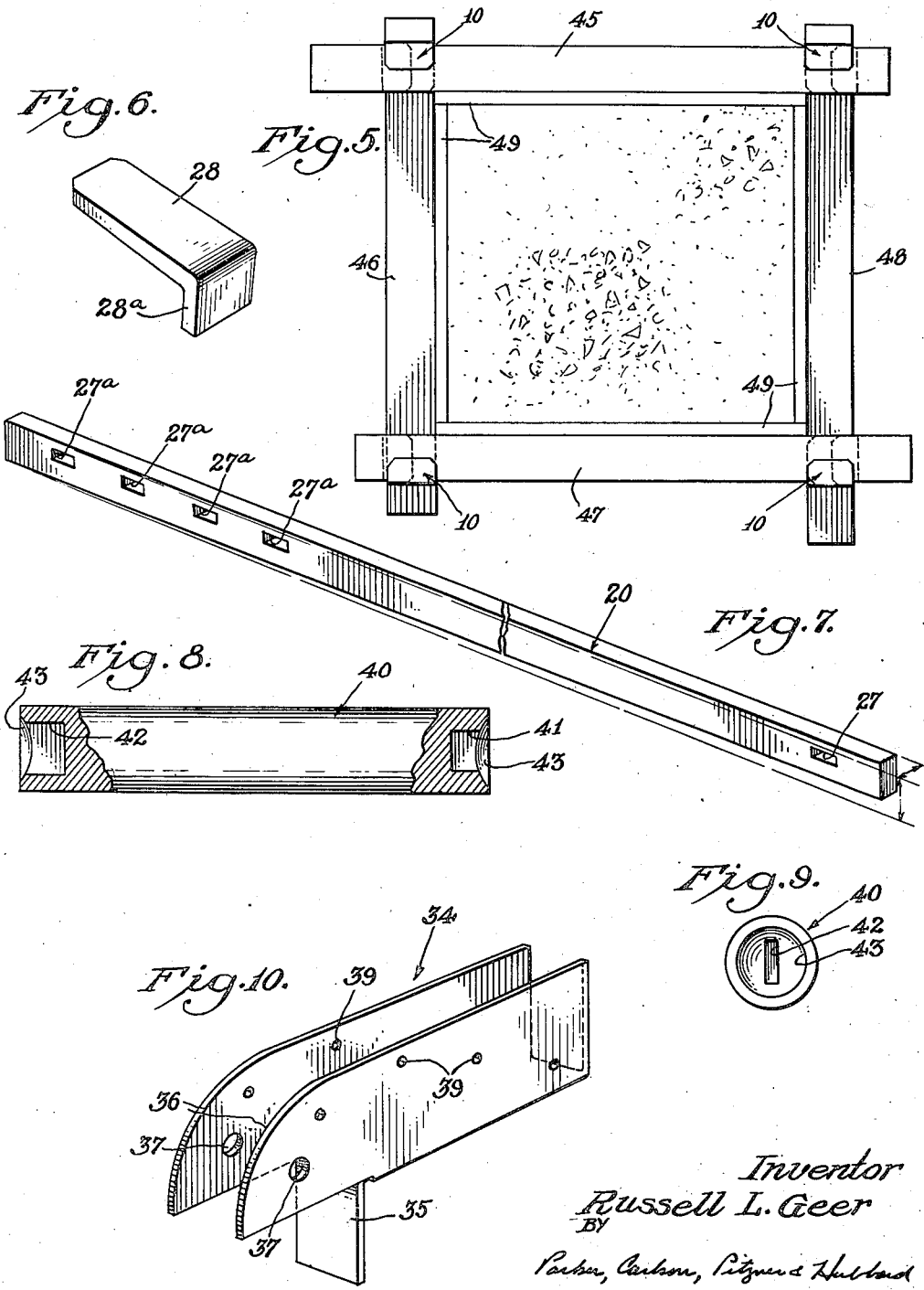
Inventor
Russell L. Geer
BY
Parker, Carlson, Pitner & Hubbard
Attorneys.

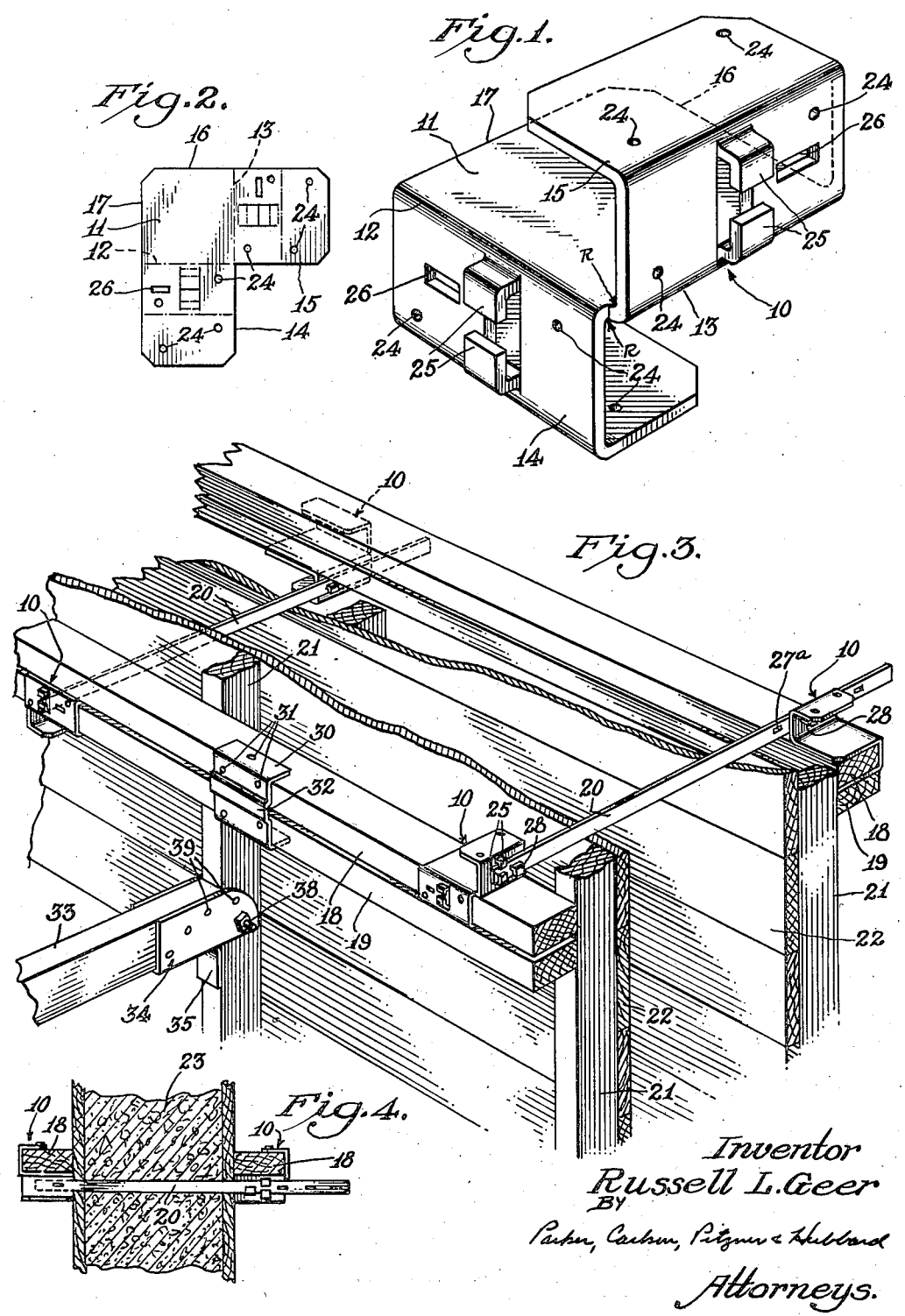

Patented Mar. 9, 1943

2,313,637

UNITED STATES PATENT OFFICE 2,313,637

HARDWARE FOR CONCRETE FORMS

Russell L. Geer, Grand Island, Nebr.

Application July 13, 1940, Serial No. 345,296

7 Claims. (Cl. 20—92)

The invention relates to hardware for use in demountable forms into which concrete is poured as, for example, in making walls and columns.

In a general sense, it is an object of the invention to provide hardware or fittings of the class indicated of such character that they can be used again and again in different installations, which do not ruin the lumber to which they are applied but, instead, permit the reuse of the lumber as well, and which can be used in the erection of an almost limitless variety of shapes and sizes of forms.

More specifically, it is an object of the invention to provide a novel form of fitting for the crossing union of a pair of timbers or the like.

Another object is to provide a novel fitting adapted for use interchangeably in making a crossing union between either a pair of timbers or a timber and a tie rod.

Another object is to provide a novel fitting for fixing together a pair of parallel wales or the like.

Still another object is to provide a novel form of fitting for rigidly, though removably, securing a bracing timber to a stud at a selectively variable predetermined angle.

The invention also resides in various structural improvements and simplifications in fittings of the class indicated by virtue of which very low cost is combined with ruggedness of structure and effectualness of operation.

Further objects and advantages of the invention will become apparent as the following description proceeds, taken in connection with the accompanying drawings, in which:

Figure 1 is a perspective view of a clamp fitting embodying my invention.

Fig. 2 is a deleveloped plan view, on a reduced scale, showing the layout of metal plate used in forming the clamp of Fig. 1.

Fig. 3 is a fragmentary perspective view of a form for a concrete wall, utilizing the clamps of Fig. 1 for joining longitudinal wales to transverse tie rods.

Fig. 4 is a detailed vertical sectional view through the wall form, showing the concrete in place.

Fig. 5 is a plan view of a column form utilizing clamps like that of Fig. 1 to join the wales.

Fig. 6 is a detail perspective view of the locking key used between the clamps and tie rods.

Fig. 7 is a detail perspective view of one of the tie rods.

Figs. 8 and 9 are, respectively, side and end elevations of a tool used in removing the tie rods, portions of the tool being broken away in Fig. 8 to illustrate the interior form of its socketed ends.

Fig. 10 is a detail perspective view of a bracket used in the set-up of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary embodiment of the invention herein shown, I have illustrated apparatus embodying my invention as utilized both in rigidly holding in place not only the walls of a form for concrete walls (see Fig. 2) but also the walls of a form for a concrete column (see Fig. 5). In fact it is the versatility and interchangeability of use of my apparatus which, in a sense, particularly characterizes it, as well as the possibility of using it time after time in different installations each of which may be different from the other.

One key item of equipment required in either the wall or column forms noted above is my novel fitting or clamp (Fig. 1), designated generally as 10. In its illustrative form, this clamp 10 is fashioned as a unitary structure from a single metal plate having a body portion 11 which is generally square in outline. From two adjacent edges 12 and 13 of this body 11 are bent integral ears 14 and 15, overlying in spaced relation the opposite faces of the body 11. The ears 14, 15 thus define channels shaped to receive wales or other timbers, the channels which receive these timbers also being at right angles to each other. Fig. 2 shows the layout of the plate prior to the bending of the ears, the bending lines being indicated in dotted lines. Of course, if desired additional duplicate ears may be provided on the other two edges 16 and 17 of the body 11 and bent over to oppose the ears 14 and 15 respectively so as to define opposed channels or, in other words, complete tubular sleeves on opposite faces of the body 11.

When using the clamps 10 in a wall form, such as that shown in Fig. 3, the clamps serve to connect pairs of longitudinal wales 18 or 19 with transverse tie rods 20, which extend through the form (see Fig. 4) and are removed after the concrete has set. The wales 18, 19 extend along the outer sides of the form walls and bear against the outer edges of spaced upright studs 21. The usual form boards 22 are nailed to the inner edges of these studs. With the transverse tie rods 20 rigidly connected to the wales 18, 19, it will thus be seen that the form walls comprised of the studs 21 and form boards 22 are rigidly braced against spreading apart when concrete 23 (Fig. 4) is poured into the form.

In applying the clamps 10 to the wales 18 or 19, the wales are slipped into the channels defined by one of the ears on the clamp as shown in Fig. 3. Suitable holes are provided in the clamps for nailing them to the inserted timbers so that the clamps will not slip endwise along the latter. A snug fit of the clamp about the wale or other timber inserted into it is insured by providing a substantial radius R at the edges 12 and 13 between the clamp body 11 and the integral ears on it (see Fig. 1). Provision of a substantial radius at this point insures a snug fitting of the timber in the jaw of the clamp despite irregularities in size which ordinarily occur in rough lumber, and also despite any lack of true squareness or right angularity between adjacent faces of the timbers.

As to means of attachment of tie rods 20 to the clamps 10, it should be noted that the end portions of the tie rods are received between and guided by opposed pairs of lugs 25 struck out from the portions of the ears 14, 15 which constitute the bottoms of the channels defined on the opposite faces of the clamp. Furthermore, slots 26 are formed in each of these same portions of the clamps adjacent the guiding lugs 25. In the tie rod 20 a corresponding slot 27 is formed adjacent one end of the rod end and a series of such slots 27ª at spaced points adjacent the other end (Fig. 7). Keys 28 (Figs. 3 and 6) are inserted through registering ones of the slots in the clamps and tie rods to hold them against displacement with respect to each other. As will be observed in Fig. 6, the larger or butt ends of the keys 28 have lugs 28ª turned on them so as to prevent inadvertent displacement of the keys. The series of alternatively available slots 27ª accommodates the tie rods to different widths of walls. It will thus be seen that it is a very simple matter to apply the clamps to the wales and then interconnect them by the tie rods 20 and locking keys 28 in setting up the form.

Upon reference to Fig. 3 it will be observed that two longitudinal wales 18, 19 are provided on each side of the form and that the clamps 10 are applied to alternate ones of these wales. This alternation of application of the clamps to the wales is continued at successive suitable spaced stations throughout the length of the structure. In this way the forces tending to twist the wales about their longitudinal axes are equalized, each pair of wales being held together as a unit by wale clamps or fittings 30. These clamps 30 also prevent spreading of the wales in each pair. Each of the clamps 30 is formed from a single, generally rectangular, piece of metal bent into channel form as shown and having suitably spaced holes 31 in it through which nails may be driven to hold it in place on the wales. A longitudinal offset 32 is fashioned along the median line of the root or bottom of the channel to overlie the parting line between the adjacent wales and thereby accommodate slight variations in dimensions of the same. The offset also provides a driving edge on the clamp.

To prevent the form walls from collapsing inward before the concrete is poured, it is customary to attach braces to the studs 21, such for example as a brace 33 (Fig. 3) extending to an adjacent form or the like (not shown). In order that such a brace may be readily applied in setting up the form, and removed in taking it down, all without tearing up the lumber with spikes, I utilize a fitting or bracket designated generally as 34. This bracket 34 (see Fig. 10) is, like the clamps described above, also desirably fashioned from a sheet of metal and is of channel shape with a tongue 35 bent down from the bottom of the channel. The forward corner of the side walls may be rounded as indicated at 36 to provide clearance enabling the bracket when pivotally mounted on the stud to be swung to an out-of-the-way or storage position in which it straddles the stud. The bracket is pivotally mounted on the stud as by a bolt 38 (Fig. 3) extending through the stud and through a pair of registering holes 37 in the bracket side walls. It will be observed that the tongue 35 bears against the adjacent edge of the stud to determine the angular position of the bracket and this angle can be varied to accommodate the requirements of different installations simply by bending the tongue 35 around to the required angle. Since the tongue is simply a position determining member, it may be omitted if desired without impairing the required function of the bracket. Holes 39 in the side walls of the bracket permit it to be lightly nailed to the stud and to the brace 33.

Complete demountability of the form and its securing means, including even the tie rods 20 which extend through the concrete, is possible after the concrete has set. In taking down the form the keys 28 are taken out and the clamps 10 and 30 pried off of the wales 18, 19. With the tie rods 20 thus disconnected from the clamps 10 they are driven endwise to free them from the wall. Such endwise movement of the rods 20 is possible since they are fashioned with a longitudinal compound taper (Fig. 7). A driving tool 40 (Figs. 8 and 9) may be used in removing the tie rods. This tool comprises simply a heavy metal pin with sockets 41 and 42 in its opposite ends positioned respectively to receive the small and large ends of the tapered tie rods. Desirably the ends of the tool are also recessed, as indicated at 43, so that hammering the ends of the tool in driving out the tie rods will not deform the socket edges.

It will be seen from the foregoing that the complete disassembly of the parts makes it possible to reuse all of the lumber and hardware in a succeeding form set-up. The hardware affords strong joints between the timbers without the necessity of tearing it up with heavy spiking so that even the braces and wales can be used again and again.

The clamps 10 can be used with equal facility to form a crossing union between a pair of wales, instead of between a wale and a tie rod as above. Such a union of wales may be used in a column form or in support of the wall which closes the open end of a wall form. For example, the column form shown in Fig. 5 comprises four of my clamps 10 arranged to join wales 45, 46, 47 and 48 which are angularly related on the respective sides of the column. The wales thus joined embrace the wall boards 49 of the box-like column form. When applying the clamps 10 to such an installation, the end portions of a particular pair of wales, to be joined by one of the clamps, are inserted in the respective angularly disposed channels of the clamp. For example, at the upper left-hand corner of the form shown in Fig. 5, a wale 45 is inserted in a channel on the upper face of the corresponding clamp 10 while the wale 46 is inserted in the right angularly disposed channel on the lower face of the clamp. When a single form of clamp is used in this manner, certain of the wales at diametrically opposed corners will be seated in channels that open outwardly from the corner instead of inwardly as shown. The security afforded by the nails will, however, hold the assembly rigid. For utmost security, however, the clamps will preferably be formed as right and left-hand units. Thus, as shown at the upper right-hand corner of Fig. 5, the clamp 10 is of the other "hand" than that at the first mentioned upper left-hand corner. A clamp of this same reversed form is also used at the diagonally opposite or lower left corner in Fig. 5, while the clamp at the lower right corner is identical with that at the upper left. Where clamps embodying duplicates of the ears 14, 15 are used, each clamp will serve any corner.

With the clamps 10 and wales 45 to 48 positioned as shown in Fig. 5, the clamps are nailed to the wales to prevent slippage along the latter. If desired, the wall boards 49 can, of course, be nailed to the encircling wales. When the clamps are so positioned, each wale is received in a pair of clamp jaws or channels, adjacent its respective ends, which hold it positively against displacement outwardly away from the form and in which direction the greatest force is applied in use, namely, that incident to the weight of the concrete poured into the form. Movement of the wales in an opposite or inward direction, such as would cause collapse of the form, is also prevented by the nails holding the wales in the respective clamp jaws.

Also to be particularly observed is the complete flexibility of dimensions afforded with the clamping arrangement just described. Since the wales have crossing, rather than butt unions, they can be of any reasonable length and still define an enclosed rectangle of any desired cross-section. This does away with the necessity of cutting the wales to length for each particular form in which they are employed.

When the clamps 10 are used in joining two timbers, as just described, the lugs 25 and slots 26 are, of course, not actually used since they play a part only in the attachment of a tie rod. Their presence does not, however, interfere in any way with the reception of the timbers in the clamp jaws. Particularly notable in this connection is the fact that the elements 25, 26 do not include any protrusions whatever within the confines of the timber-receiving clamp jaws themselves.

It is characteristic of all three of the fittings 10, 30 and 34 herein shown that they can be formed very simply and cheaply from suitable steel plate or the like. In this connection observe particularly that even in the case of the clamp 10, the lugs 25 and slots 26 can all be fashioned by suitable forming dies while the plate is still flat (Fig. 2) and then it can be bent into proper shape. Fashioning of the elements 25, 26 is, of course, much simpler in a flat piece of metal than in some more complicated shape, in view of the simplicity of the die forms which can be used.

I claim as my invention:

1. A fitting of the class described comprising a single unitary metal plate having a flat body portion adapted to be inserted between a pair of crossed timbers which it is to join and having ears projecting from adjacent and generally right angularly disposed edges thereof and turned back to overlie in spaced relation the opposite faces of said body of the plate and thereby form right angularly related channels on the respective opposite sides of the plate for the reception of the timbers to form a crossing union between the latter.

2. A fitting of the class described comprising a metal plate having a polygonal portion with integral ears extending from at least two adjacent edges thereof, the ears on adjacent edges being curled back over respective opposite faces of said body portion of the plate to form angularly related timber-receiving jaws on the respective sides of said body portion, and said ears being apertured for the passage of nails into timbers received in the jaws to hold the fitting in place thereon.

3. A fitting of the class described comprising a metal plate having a polygonal portion with integral ears extending from at least two adjacent edges thereof, the ears on adjacent edges being curled back over respectively opposite faces of said body portion of the plate to form annularly related timber-receiving jaws on the respective sides of said body portion, and the junctures between the ears and said body portion having a curvature of substantial radius to afford a wide tolerance in dimensions and squareness of timbers received in the jaws.

4. A fitting adapted for use interchangeably in forming a crossing union between a pair of crossed timbers or a union between a timber and a tie rod, comprising a metal plate having a flat body portion and two upright ears on adjacent and substantially right angularly disposed edges of said body portion, said ears extending from the plane of said body portion in opposite directions and each having an edge flange on its free end overlying the corresponding face of the body portion, thereby defining angularly related channels on the opposite faces of the body portion for the reception of a pair of crossed timbers, and at least one of said ears having a pair of opposed lugs struck out from the portion thereof extending upright from the clamp body to define between such lugs a guideway for a tie rod inserted therebetween, said portion of said ear also having an aperture therein for the reception of a locking key thrust through it and through a registering aperture in a tie rod slipped into said guideway.

5. A fitting adapted for use interchangeably in forming a crossing union between a pair of crossed timbers or a union between a timber and a tie rod, comprising a metal plate having a flat body portion and two upright ears on adjacent and substantially right angularly disposed edges of said body portion, said ears extending from the plane of said body portion in opposite directions and each having an edge flange on its free end overlying the corresponding face of the body portion, thereby defining angularly related channels on the opposite faces of the body portion for the reception of a pair of crossed timbers, and at least one of said ears having means on the portion thereof which extends upright from the body portion to form part of a releasable connection with a tie rod.

6. A fitting adapted for use interchangeably in forming a crossing union between a pair of crossed timbers or a union between a timber and a tie rod comprising a metal plate having a flat body portion, and upright ears on adjacent and substantially right angularly disposed edges of said body portion extending from the plane of said body portion in opposite directions to define angularly related channels on the opposite faces of the body portion for the reception of a pair of crossed timbers, said ears being apertured for the passage of securing means into timbers in said channels, and at least one of said ears having means for connecting a tie rod thereto.

7. A fitting adapted for use interchangeably in forming a crossing union between a pair of crossed timbers or a union between a timber and a tie rod comprising a plate having a flat body portion and upright ears on adjacent and substantially right angularly disposed edges of said body portion, said ears extending from the plane of said body portion in opposite directions, at least one of said ears having an edge flange on its free end overlying the corresponding face of the body portion, said ears defining angularly related channels on the opposite faces of the body portion for the reception of a pair of crossed timbers and at least one of said ears having means on the portion thereof which extends upright from the body portion forming a part of a releasable connection with a tie rod.

RUSSELL L. GEER.